Figure 1:
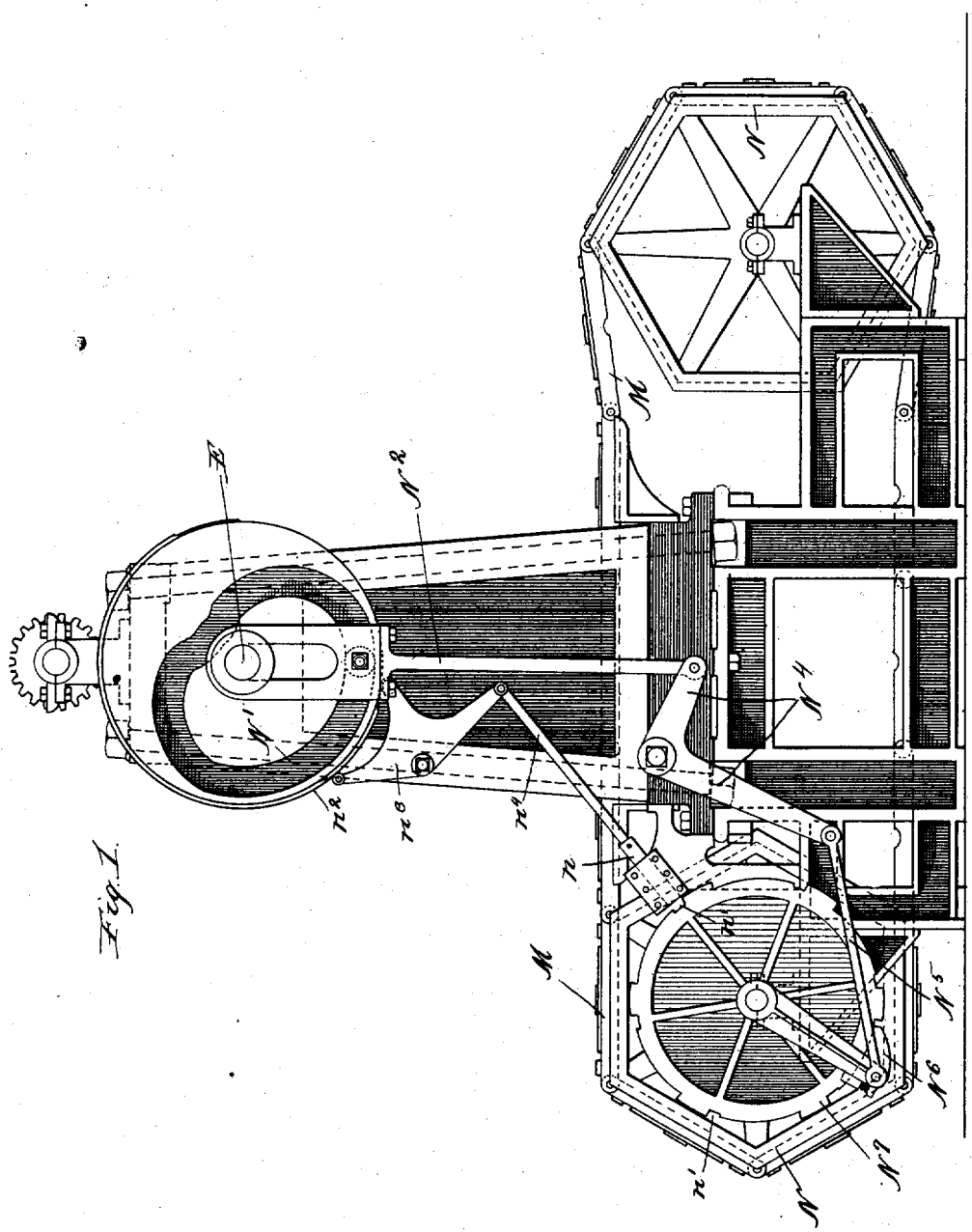

(No Model.) 6 Sheets—Sheet 1.

J. G. HODGSON.
DOUBLE ACTING GANG DIE PRESS.

No. 413,667. Patented Oct. 29, 1889.

(No Model.) 6 Sheets—Sheet 2.
J. G. HODGSON.
DOUBLE ACTING GANG DIE PRESS.

No. 413,667. Patented Oct. 29, 1889.

Witnesses:
Lew. E. Curtis.
H. M. Munday

Inventor:
John G. Hodgson
By Munday Evarts & Adcock
his Attorneys.

(No Model.)

6 Sheets—Sheet 4.

J. G. HODGSON.
DOUBLE ACTING GANG DIE PRESS.

No. 413,667. Patented Oct. 29, 1889.

Witnesses:
Sew. E. Curtis
H. W. Munday

Inventor
John G. Hodgson
By Munday Evarts & Adcock
his Attorneys.

(No Model.)
J. G. HODGSON.
DOUBLE ACTING GANG DIE PRESS.
No. 413,667. Patented Oct. 29, 1889.
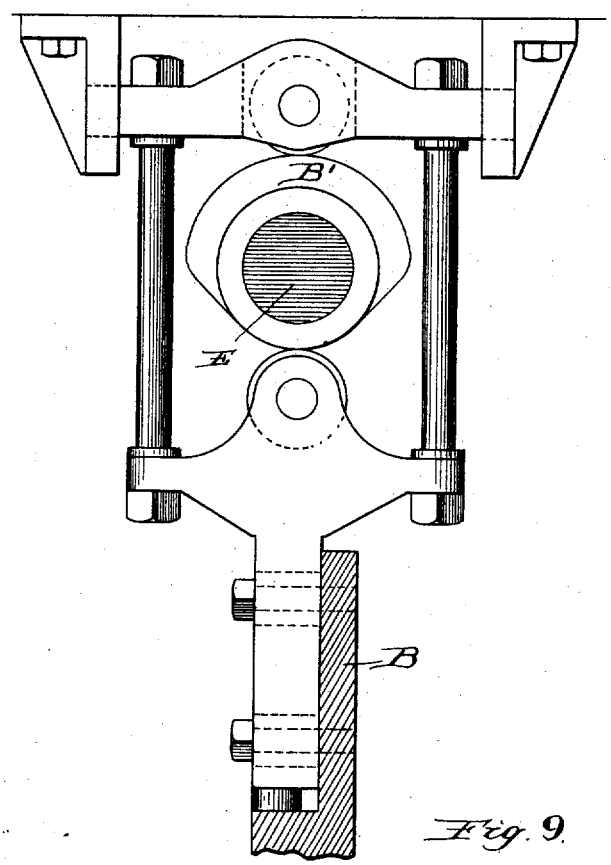
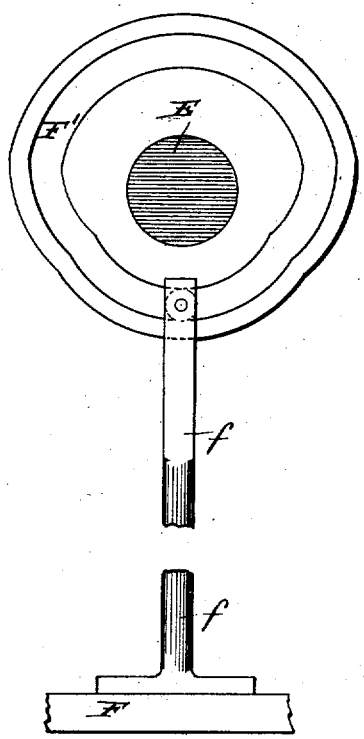
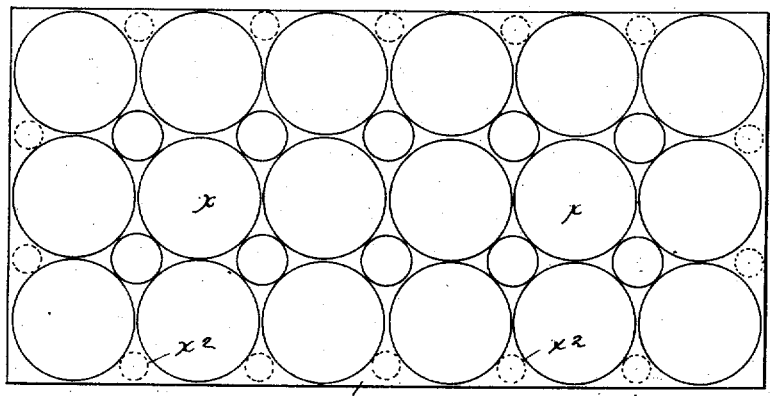
Witnesses:
Geo. E. Curtis.
H. W. Munday
Inventor:
John G. Hodgson
By Munday, Evarts & Adcock
His Attorneys (No Model.)
J. G. HODGSON.
DOUBLE ACTING GANG DIE PRESS.
No. 413,667. Patented Oct. 29, 1889.
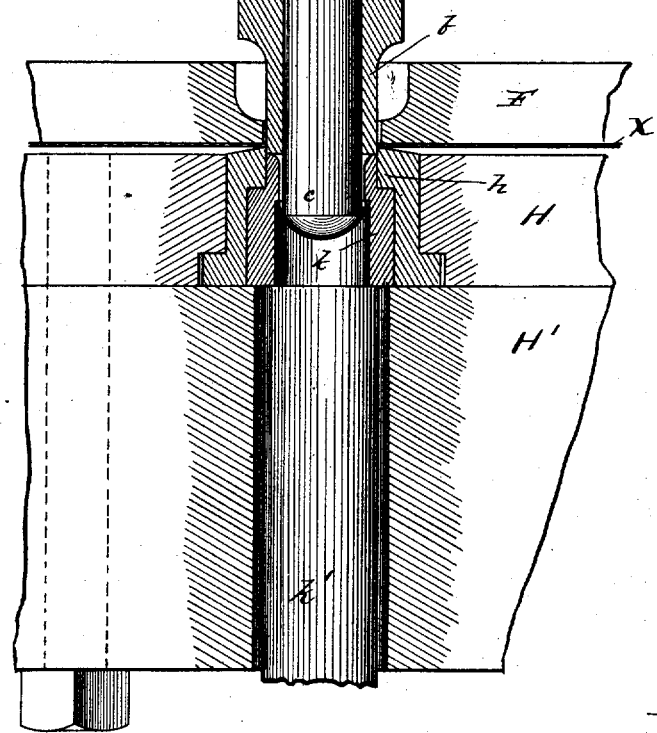
Witnesses:
Geo. C. Curtis.
H. W. Munday
Inventor:
John G. Hodgson
By Munday Evarts & Adcock
His Attorneys.

UNITED STATES PATENT OFFICE.

JOHN G. HODGSON, OF MAYWOOD, ILLINOIS, ASSIGNOR TO EDWIN NORTON, OF SAME PLACE, AND OLIVER W. NORTON, OF CHICAGO, ILLINOIS.

DOUBLE-ACTING GANG-DIE PRESS.

SPECIFICATION forming part of Letters Patent No. 413,667, dated October 29, 1889.

Application filed August 23, 1889. Serial No. 321,693. (No model.)

*To all whom it may concern:*

Be it known that I, JOHN G. HODGSON, a citizen of the United States, residing at Maywood, in the county of Cook and State of Illinois, have invented a new and useful Improvement in Double-Acting Gang-Die Presses, of which the following is a specification.

My invention relates to improvements in gang-die presses for cutting blanks from tin or other sheet metal.

The object of my invention is to provide a double-acting gang-die press for cutting and shaping button-blanks from a scrap-sheet, such as is left after the can-heads have been cut from the sheet according to the method and apparatus shown and described in Letters Patent No. 304,352, of September 2, 1884, and No. 361,286, of April 19, 1887. As the can-head and can-cap blanks are cut accurately and uniformly, so as to leave regular and uniform spaces, by the gang-die press shown and described in said last-mentioned patent, all the button or other blanks may be cut from the interstices simultaneously by a series of gang-dies; but to do this it is necessary that the sheet be made to register with the gang of button-blank dies with absolute accuracy.

The button-blanks which my improved machine is specially designed to form are of discoid shape, and two successive operations are necessary to form them, one step or operation being to cut the blank from the scrap-sheet and the other to press it into discoid or semispherical shape.

In my improved machine the scrap-sheets—that is to say, sheets after the can-heads or other blanks have been cut therefrom—are automatically fed to the gang of dies, which cut and shape the button-blanks by means of a chain feed, and each feed-plate of the chain is furnished with registering pins or bosses which enter two of the can-head holes in the scrap-sheet, so that the relative position of the sheet to the plate upon which it lies is thus made absolutely accurate and uniform, and the machine is provided with suitable mechanism for registering with accuracy and certainty the position of the chain and of the sheet-supporting plate thereon to the dies. I am thus enabled to register the sheet accurately with the dies, and also to feed the scrap-sheets automatically to the press.

Figure 2:
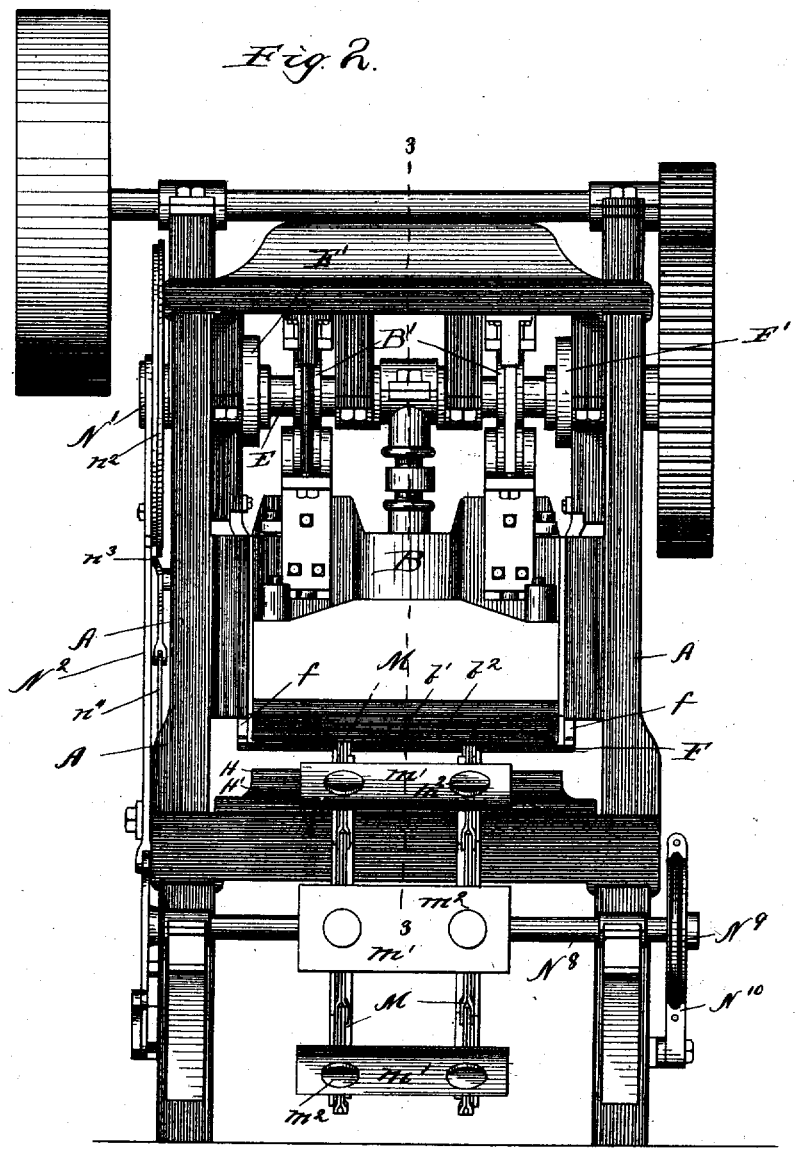
Figure 3:
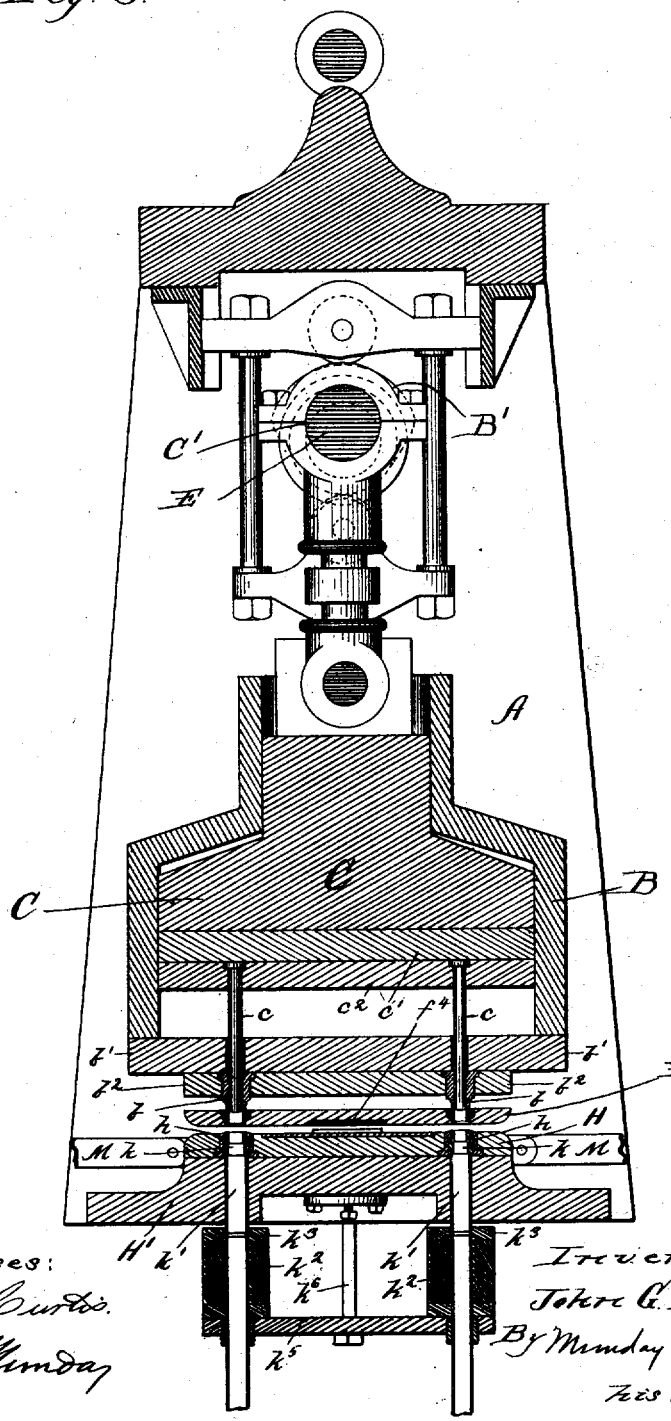
Figure 4:
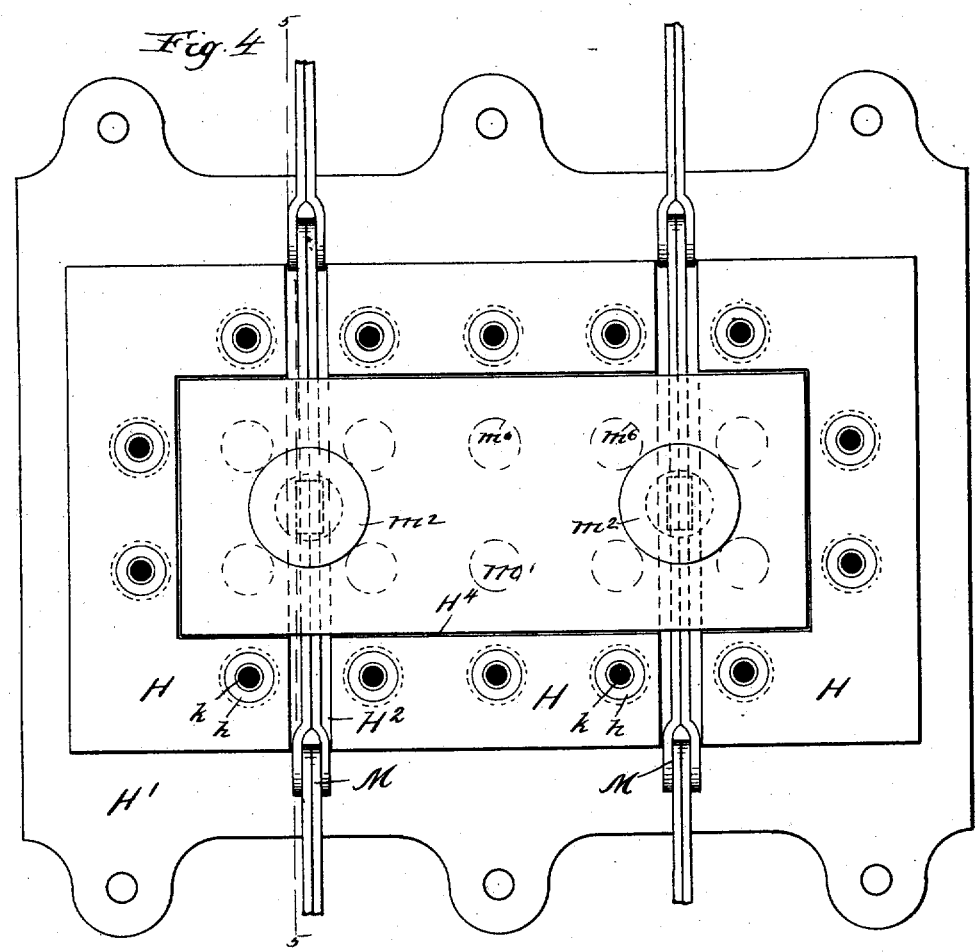
Figure 5:
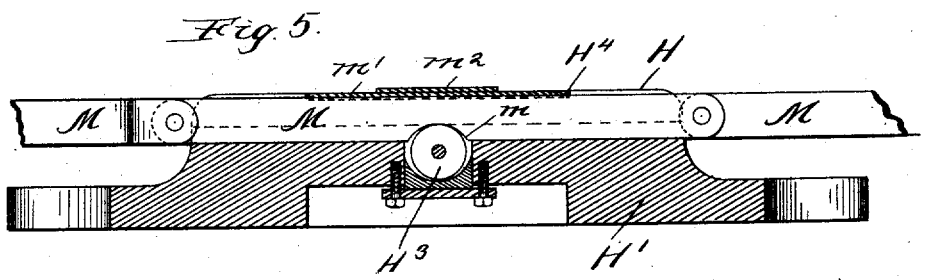

In the accompanying drawings, which form a part of this specification, and in which similar letters of reference indicate like parts, Figure 1 is a side elevation of a machine embodying my invention. Fig. 2 is a front or end view. Fig. 3 is a vertical section on line 3 3 of Fig. 2. Fig. 4 is an enlarged plan view showing the gang of female dies. Fig. 5 is a section on line 5 5 of Fig. 4. Fig. 6 is an enlarged detail view showing the cross-head and operating-cams. Fig. 7 is a detail view showing the cam for operating the stripper or smoother plate. Fig. 8 is an enlarged detail vertical sectional view showing the cutting and forming dies. Fig. 9 is a plan view showing the scrap-sheet from which the button-blanks are to be cut. Figs. 10 and 11 are views showing a button-blank which is produced by the machine.

In the drawings, A represents the frame of the machine. The machine is furnished with two cross-heads or reciprocating plungers B and C, the latter within the former. The blank-cutting male dies $b$ are secured to a die-plate $b'$ and match-plate $b^2$, attached to and carried by the outer plunger or cross-head B. The shaping or forming male dies $c$ are secured to a die-plate $c'$ and match-plate $c^2$, which is attached to and carried by the cross-head C. The cross-head B is operated by a cam B' on the driving-shaft E, and the cross-head C is operated by the crank C' on the same shaft. The two cross-heads B and C thus have an independent movement, so that the punches or shaping-dies $c$ may act subsequently to the cutting-dies $b$.

A stripper or smoother plate F, having holes for the dies to operate through, comes down in advance of the dies upon the sheet for the purpose of holding it and smoothing it out. The stripper-plate F is operated from cams F' on the driving-shaft E through the connecting rods or links $f$. The female cutting-die $h$ is secured in the match or die plate H, and the female forming or shaping die $k$ is secured within the cutting-die $h$. The die or match plate H rests upon a bed or frame plate H', and the plate H is made in three parts or sections, as indicated in Fig. 4, to form channels or passages $H^2$ for the links of the chain-carrier M, by which the scrap-sheets X are fed to the press. The plate H, of course, could be made in one piece, and notches or grooves cut in its upper face to form the passages or ways $H^2$ for the chain. The chain-carrier M is mounted upon wheels or pulleys N N. An intermittent movement is imparted to the pulley N by means of a cam N', link $N^2$, bent lever $N^4$, link $N^5$, and pawl $N^6$, which engages the teeth of a ratchet $N^7$ on the shaft of the pulley N. The pulley N is locked in position to cause the sheet X to register properly with the gang of dies by means of a lock-bolt $n$, which engages recesses $n'$ in the ratchet-wheel $N^7$. The locking-bolt $n$ is actuated by a cam $n^2$ through the lever $n^3$ and pivoted link $n^4$.

The bed-plate H' is provided with a roller $H^3$, and each of the links of the chain is furnished with a cam or curved recess $m$, so that when the chain-carrier gets into position between the dies the chain will drop down and let the scrap-sheet X rest flat upon the die-plate H, and so that when the carrier again moves forward it will raise the chain and the scrap-sheet with it, so that the scrap-sheet will properly clear the dies. By this means the sheet X, carried upon the feed-chain, is prevented from catching or scraping against the dies or die-plate both when it is being moved into position and when it is being moved or carried out of the press.

The chain-carrier M preferably consists of double links, as is clearly shown in Figs. 2 and 4, and each link is furnished with a scrap-sheet-supporting plate $m'$, provided with pins or bosses $m^2$, preferably two in number, adapted to fit within two of the holes $x$ formed in the sheet by cutting out the can-heads. The holes $x'$ (shown in Fig. 9 in the scrap-sheet) represent the spaces left by cutting out the can-caps. The dotted lines $x^2$ in Fig. 9 represent the button-blanks which are to be cut from the sheet, and $x^3$, Figs. 10 and 11, represent the finished blank after being cut and formed by the machine.

The match-plate H is furnished with a recess $H^4$, corresponding in size and depth to the sheet-supporting plate $m'$, so that the plate $m'$ may sink down flush with the upper surface of the match or die plate H when the dies act upon the sheet. The roller $H^3$ and the cams or notches $m$ serve to raise the plate $m'$ out of the recess $H^4$.

It will be observed that the plate or sheet holder $m'$ of the carrier M is made of such size or shape as not to interfere with the operation of the gang of dies $b\ c\ h\ k$. As the gang of dies are arranged to cut the button-blanks from the margin of the sheet, the plate or holder $m'$ occupies the intermediate or central position. If the blanks were to be cut from the central portion of the sheet, the plate or holder $m'$ would of course be constructed with openings through which the dies could operate. Such an opening is indicated in the drawings at $m^6$ on Fig. 4.

The female forming-die $k$ is mounted movably within the cutting-die $h$, and rests upon a hollow or tubular support $k'$, extending through the bed-plate H'. The tubes $k'$ are supported on springs $k^2$, preferably of rubber, the tubes $k'$ being furnished with collars $k^3$ to bear against the rubber springs $k^2$. The springs $k^2$ rest upon a plate $k^5$, attached to the bed or frame plate H' by rods $k^6$. The tubes $k'$ extend through the hollow springs to form a discharge-passage for the button-blanks.

The stripper-plate F is furnished with a recess $f^4$, to receive the boss or pin $m^2$ on the scrap-sheet-supporting plate $m'$. This is clearly shown in Fig. 3.

The wheels or pulleys N or their shafts $N^8$ are furnished with friction-wheels $N^9$ and friction clamps or brakes $N^{10}$, which serve to check the momentum of the carrier M on the registering or locking device as the carrier is intermittently stopped, and to prevent any tendency of a recoil or rebound. These friction clamps or brakes I find to be a great improvement in practically bringing the carrier or the scrap-sheet carried thereby into proper register with the gangs of dies.

The stripper plate or pad F is actuated by cams, as before described, so that when the male gang of dies are retracted the stripper-plate may by its cam be held stationary for a period, so as to prevent the scrap-sheet X from being displaced on the sheet-holder $m$ of the carrier. This particular construction of the smoother-plate and its operating-cam, the gangs of dies, and the sheet-carrier M is of great service in the practical operation of the machine, as it is necessary to keep the scrap-sheet X in place on the carrier or holder in order that the carrier may properly convey it out of the way after the button-blanks have been cut therefrom.

I claim—

1. The combination of an endless flexible intermittently-moving carrier M, having scrap-sheet-supporting plates $m'$, provided with registering pins or bosses $m^2$, adapted to enter openings in the scrap-sheet, and a gang of dies arranged to cut blanks from the interstices in the scrap-sheet, substantially as specified.

2. The combination of an endless flexible intermittently-moving carrier M, having scrap-sheet-supporting plates $m'$, provided with registering pins or bosses $m^2$, adapted to enter openings in the scrap-sheet, a gang of dies arranged to cut blanks from the interstices in the scrap-sheet, and mechanism for intermittently moving the carrier and locking or registering it in position, substantially as specified.

3. The combination, with intermittently-moving link-chain carrier M, of a die-plate or match-plate H, having passages or channels H² for the links of the chain, and a gang of dies, substantially as specified.

4. The combination of an intermittently-moving carrier M, furnished with sheet-holders $m'$, and a die-plate H, having a recess H⁴ for the reception of the sheet-holder $m$, substantially as specified.

5. The combination of an intermittently-moving carrier M, furnished with sheet-holders $m'$, a die-plate H, having a recess H⁴ for the reception of the sheet-holder $m'$, and means for raising such sheet-holder out of such recess as the carrier moves forward, substantially as specified.

6. The combination of an intermittently-moving carrier M, furnished with sheet-holders $m'$, and a die-plate H, having a recess H⁴ for the reception of the sheet-holders $m'$, said die-plate H having a roller H³, engaging a cam on the carrier for raising the sheet-holder out of the recess in the die-plate, substantially as specified.

7. In a gang-die press, the combination of two cross-heads B C with two gangs of male and two gangs of female dies, substantially as specified.

8. The double-acting gang-die press having two gangs of dies and two separate cross-heads for actuating the same, substantially as specified.

9. The combination, in a gang-die press, of an outer cross-head B and an inner cross-head C, die-plate $c'$ and match-plate $c^2$, secured to said cross-head C, and die-plate $b'$ and match-plate $b^2$, secured to said cross-head B below said plates $c'$ $c^2$, and a gang of dies secured in said plates $c'$ $c^2$ and a separate gang of dies secured in said plates $b'$ $b^2$, substantially as specified.

10. The combination, in a gang-die press, of an outer cross-head B and an inner cross-head C, die-plate $c'$ and match-plate $c^2$, secured to said cross-head C, and die-plate $b'$ and match-plate $b^2$, secured to said cross-head B below said plates $c'$ $c^2$, and a gang of dies secured in said plates $c'$ $c^2$, a separate gang of dies secured in said plates $b'$ $b^2$, and means for operating said cross-heads independently of each other, substantially as specified.

11. The combination, in a gang-die press, of an outer cross-head B and an inner cross-head C, die-plate $c'$ and match-plate $c^2$, secured to said cross-head C, and die-plate $b'$ and match-plate $b^2$, secured to said cross-head B below said plates $c'$ $c^2$, and a gang of dies secured in said plates $c'$ $c^2$, a separate gang of dies secured in said plates $b'$ $b^2$, and a stripper or smoother plate F, substantially as specified.

12. The combination, in a gang-die press, of an outer cross-head B and an inner cross-head C, die-plate $c'$ and match-plate $c^2$, secured to said cross-head C, and die-plate $b'$ and match-plate $b^2$, secured to said cross-head B below said plates $c'$ $c^2$, a gang of dies secured in said plates $c'$ $c^2$, a separate gang of dies secured in said plates $b'$ $b^2$, a bed-plate H' and match-plate H, a gang of cutting-dies $h$, secured in said plates H H', and a gang of forming-dies $k$, substantially as specified.

13. The combination, in a gang-die press, of an outer cross-head B and an inner cross-head C, die-plate $c'$ and match-plate $c^2$, secured to said cross-head C, and die-plate $b'$ and match-plate $b^2$, secured to said cross-head B below said plates $c'$ $c^2$, a gang of dies secured in said plates $c'$ $c^2$, a separate gang of dies secured in said plates $b'$ $b^2$, a bed-plate H' and match-plate H, a gang of cutting-dies $h$, secured in said plates H H', and a gang of forming-dies $k$, said forming-dies $k$ being hollow and resting on movable tubular supports $k'$, substantially as specified.

14. The combination, in a gang-die press, of an outer cross-head B and an inner cross-head C, die-plate $c'$ and match-plate $c^2$, secured to said cross-head C, and die-plate $b'$ and match-plate $b^2$, secured to said cross-head B below said plates $c'$ $c^2$, a gang of dies secured in said plates $c'$ $c^2$, a separate gang of dies secured in said plates $b'$ $b^2$, a bed-plate H' and a match-plate H, a gang of cutting-dies $h$, secured in said plates H H', and a gang of forming-dies $k$, said forming-dies $k$ being hollow and resting on movable tubular supports $k'$, said tubular supports $k'$ being supported by springs $k^2$, substantially as specified.

15. In a gang-die press for cutting out blanks from the interstices of a scrap-sheet, the combination, with a gang of dies, of a scrap-sheet holder furnished with registering pins or bosses adapted to enter openings in the scrap-sheet, substantially as specified.

16. The combination, in a gang-die press, of a gang of dies with an intermittently-moving endless-chain carrier M, pulleys or wheels N N, cam N', link N², lever N⁴, link N⁵, pawl N⁶, and ratchet N⁷, substantially as specified.

17. The combination, in a gang-die press, of a gang of dies with an intermittently-moving endless-chain carrier M, pulleys or wheels N N, cam N', link N², lever N⁴, link N⁵, pawl N⁶, ratchet N⁷, lock-bolt $n$, said wheel N⁷ having recesses $n'$, cam $n^2$, lever $n^3$, and link $n^4$, substantially as specified.

18. The combination, in a gang-die press, of a gang of dies with an intermittently-moving endless-chain carrier M, pulleys or wheels N N, locking-bolt $n$, wheel N⁷, provided with recesses $n'$, cam $n^2$, lever $n^3$, and link $n^4$, substantially as specified.

19. The combination of an intermittently-moving endless flexible carrier with wheels or pulleys upon which it is mounted, such carrier being furnished with holders for supporting the sheet, and a pair of dies, substantially as specified.

20. The combination, with a gang of dies, of an intermittently-moving endless flexible carrier provided with holders for the sheets to be acted upon by the dies, whereby the sheets may be automatically carried to and register with the dies, substantially as specified.

21. The combination, with a gang of dies, of an intermittently-moving endless flexible carrier provided with holders for the sheets to be acted upon by the dies, whereby the sheets may be automatically carried to and register with the dies, said sheet-holders being provided with registering pins or devices for governing the position of the sheet on the holder, substantially as specified.

22. In a double-acting gang-die press, the combination of a cross-head B and its guides, a cross-head C and its guides, and two separate gangs of dies operated by said cross-heads, substantially as specified.

23. The combination, with a movable sheet-carrier furnished with sheet-holders, of a cross-head, a die operated thereby, a stripper plate or pad F, and a cam for operating it so that the stripper-plate may serve to keep the sheet in place on its die-holder as the die is withdrawn, substantially as specified.

24. The combination, in a gang-die press, of a gang of male and female dies, an intermittently-moving flexible carrier M, wheels or pulleys upon which it is mounted, and friction or brake devices for controlling the movement of said carrier, so that the carrier may operate to bring the sheet-holders thereon into register with the dies, substantially as specified.

JOHN G. HODGSON.

Witnesses:
H. M. MUNDAY,
EMMA HACK.